United States Patent [19]

Shibahashi et al.

[11] Patent Number: 5,558,700

[45] Date of Patent: Sep. 24, 1996

[54] REVERSIBLE THERMOCHROMIC COMPOSITION

[75] Inventors: Yutaka Shibahashi; Jun Sugai, both of Nagoya, Japan

[73] Assignee: The Pilot Ink Co., Ltd., Nagoya, Japan

[21] Appl. No.: 362,991

[22] Filed: Dec. 23, 1994

[30] Foreign Application Priority Data

Dec. 24, 1993 [JP] Japan ................................. 5-347755
Oct. 28, 1994 [JP] Japan ................................. 6-288742

[51] Int. Cl.⁶ ................................................. C09D 11/00
[52] U.S. Cl. .................. 106/21 A; 106/22 B; 106/23 B; 106/311; 106/498; 252/34.16; 252/408.1; 252/583; 252/586; 252/600; 252/962
[58] Field of Search ................................... 106/498, 311, 106/21 A, 23 B, 22 B; 252/408.1, 600, 962, 586, 301.16, 583

[56] References Cited

U.S. PATENT DOCUMENTS

| | | | |
|---|---|---|---|
| 1,592,148 | 7/1926 | Munn | 401/1 |
| 4,028,118 | 6/1977 | Nakasuji et al. | 106/21 |
| 4,176,273 | 11/1979 | Fujie | 219/220 |
| 4,717,710 | 1/1988 | Shimizu et al. | 503/213 |
| 4,720,301 | 1/1988 | Kito et al. | 106/21 |
| 4,725,462 | 2/1988 | Kimura | 428/29 |
| 4,818,215 | 4/1989 | Taga | 431/126 |
| 4,820,683 | 4/1989 | Vervacke et al. | 503/210 |
| 4,865,648 | 9/1989 | Kito et al. | 106/21 |
| 4,895,827 | 1/1990 | Vervacke et al. | 503/210 |
| 4,917,643 | 4/1990 | Hippely | 446/14 |
| 4,920,991 | 5/1990 | Shibahashi et al. | 132/73 |
| 5,079,049 | 1/1992 | Kito et al. | 428/24 |

FOREIGN PATENT DOCUMENTS 2205255  12/1988  United Kingdom ................ 446/14

OTHER PUBLICATIONS

Chemical Abstracts vol. 73, No. 40266, "Fluorescence thermochromism of copper(I) compounds", Hardt, Horst D. et al. (Inst. Anorg. Chem., Saarland Univ., Saarbruecken, Ger.). Naturwissenschaften, 57(5), 244, 1970.

*Primary Examiner*—Mark L. Bell
*Assistant Examiner*—Scott L. Hertzog
*Attorney, Agent, or Firm*—Fitzpatrick, Cella, Harper & Scinto

[57] ABSTRACT

A reversible thermochromic composition develops fluorescent color of yellow, yellowish orange, orange, reddish orange, or red with a high color density and high color brightness, yet gives no residual color under non-color-developing conditions, and has remarkably improved light resistance. The reversible thermochromic composition, comprising a solubilized mixture of three components of (a) an electron-donating color-developing organic compound selected from pyridine types, quinazoline types, and bis-quinazoline types of compound, (b) an electron-accepting compound for the electron-donating color-developing organic compound, and (c) a compound serving as a reaction medium for causing reversibly an electron exchange reaction between the components (a) and (b) within a specified temperature range.

20 Claims, No Drawings

REVERSIBLE THERMOCHROMIC COMPOSITION

BACKGROUND OF THE INVENTION

1. Field of the Invention

The present invention relates to a reversible thermochromic composition. More particularly, the present invention relates to a reversible thermochromic composition which develops fluorescent color of yellow, yellowish orange, orange, reddish orange, red, or the like under color-developing conditions, and turns colorless under non-color-developing conditions.

2. Related Background Art

Several reversible thermochromic compositions are known which are constituted of a solubilized mixture containing essentially a reaction medium for causing reversible electron exchange between an electron-donating coloring organic compound and an electron-accepting organic compound in a specific temperature range as disclosed in U.S. Pat. Nos. 4,028,118, 4,732,810, 4,865,648, 4,720,301, etc.

These disclosed reversible thermochromic compositions for developing yellow, orange, or red color are not satisfactory in practical use owing to insufficient color density, insufficient color brightness, and to residual color in a decolored state.

SUMMARY OF THE INVENTION

The present invention intends to provide a reversible thermochromic composition which does not have the aforementioned disadvantages and develops fluorescent color of yellow, yellowish orange, orange, reddish orange, or red with a high color density and high color brightness, yet gives no residual color under non-color-developing conditions, and has remarkably improved light resistance.

After comprehensive studies on the combination of the components of the color-developing system based on the electron exchange reaction, it was found by the inventors of the present invention that the above requirements are satisfied by a solubilized mixture composed of an electron-donating color-developing organic compound selected from pyridines, quinazolines, and bisquinozolines; an electron-accepting compound serving as a color-developer for the above compound; and a reaction medium for coloring and decoloring of the above compound in a specified temperature range. Further it was found that the light resistance of the above system is remarkably improved by incorporating a light stabilizer in the above system. Thus the present invention has been accomplished.

The reversible thermochromic composition of a first embodiment of the present invention comprises a solubilized mixture of three components of (a) a pyridine type, quinazoline type, or bisquinazoline type of electron-donating color-developing organic compound, (b) an electron-accepting compound for the electron-donating color-developing organic compound, and (c) a compound serving as a reaction medium for causing a reversible electron exchange reaction between the components (a) and (b) within a specified temperature range.

The reversible thermochromic composition of a second embodiment of the present invention comprises a mutually solubilized mixture of four components of (a) a pyridine type, quinazoline type, or bisquinazoline type of electron-donating color-developing organic compound, (b) an electron-accepting compound for the electron-donating color-developing organic compound, (c) a compound serving as a reaction medium for causing reversibly an electron exchange reaction between the components (a) and (b) within a specified temperature range, and (d) one or more light stabilizer selected from UV absorbers, antioxidants, singlet oxygen quenchers, superoxide anion quenchers, ozone quenchers, and infrared absorbers.

The light stabilizer (d) is preferably a mixture of a UV stabilizer and other one or more stabilizers selected from antioxidants, singlet oxygen quenchers, superoxide anion quenchers, ozone quenchers, and infrared absorbers. The component (b), an electron accepting compound, is selected preferably from compounds having a phenolic hydroxy group and metallic salts thereof. The components (c) is a compound selected preferably from alcohols, esters, ketones, and ethers. The aforementioned essential three or four components are preferably enclosed in microcapsules. The reversible thermochromic composition is preferably changes color with a hysteresis width of from 8° C. to 30° C. in color density-temperature curve.

DETAILED DESCRIPTION OF THE PREFERRED EMBODIMENTS

The respective components of the composition are described specifically.

The preferred pyridine type compounds as the component (a) include:

4-(4'-methylbenzylaminophenyl)pyridine,
2,6-diphenyl-4-(4'-dimethylaminophenyl)pyridine,
2,6-diphenyl-4-(4'-phenyl-methylaminophenyl)pyridine,
2,6-bis(2'-methoxyphenyl)-4-(4'-dimethylaminophenyl)pyridine,
2,6-bis(2'-ethoxyphenyl)-4-(4'-dimethylaminophenyl)pyridine,
2,6-bis(2'-propoxyphenyl)-4-(4'-dimethylaminophenyl)pyridine,
2,6-bis(2'-butoxyphenyl)-4-(4'-dimethylaminophenyl)pyridine,
2,6-bis(2'-pentyloxyphenyl)-4-(4'-dimethylaminophenyl)pyridine,
2,6-bis(2'-hexyloxyphenyl)-4-(4'-dimethylaminophenyl)pyridine,
2,6-bis(2'-heptyloxyphenyl)-4-(4'-dimethylaminophenyl)pyridine,
2,6-bis(2'-octyloxyphenyl)-4-(4'-dimethylaminophenyl)pyridine,
2,6-bis(2'-methoxyphenyl)-4-(4'-diethylaminophenyl)pyridine,
2,6-bis(2'-ethoxyphenyl)-4-(4'-diethylaminophenyl)pyridine,
2,6-bis(2'-propoxyphenyl)-4-(4'-diethylaminophenyl)pyridine,
2,6-bis(2'-butoxyphenyl)-4-(4'-diethylaminophenyl)pyridine,
2,6-bis(2'-pentyloxyphenyl)-4-(4'-diethylaminophenyl)pyridine,
2,6-bis(2'-hexyloxyphenyl)-4-(4'-diethylaminophenyl)pyridine,
2,6-bis(2'-heptyloxyphenyl)-4-(4'-diethylaminophenyl)pyridine,
2,6-bis(2'-octyloxyphenyl)-4-(4'-diethylaminophenyl)pyridine,
2,6-bis(2'-methoxyphenyl)-4-(4'-N-phenyl-N-methylaminophenyl)pyridine, 2,6-bis(2'-ethoxyphenyl)-4-(4'-N-phenyl-N-methylaminophenyl)pyridine,
2,6-bis(2'-butoxyphenyl)-4-(4'-N-phenyl-N-methylaminophenyl)pyridine,
2,6-bis(2'-hexyloxyphenyl)-4-(4'-N-phenyl-N-methylaminophenyl)pyridine,
2,6-bis(2'-octyloxyphenyl)-4-(4'-N-phenyl-N-methylaminophenyl)pyridine,
2,6-bis(2'-methoxyphenyl)-4-(4'-N-chloroethyl-N-methylaminophenyl)pyridine,
2,6-bis(2'-ethoxyphenyl)-4-(4'-N-chloroethyl-N-methylaminophenyl)pyridine,
2,6-bis(2'-butoxyphenyl)-4-(4'-N-chloroethyl-N-methylaminophenyl)pyridine,
2,6-bis(2'-hexyloxyphenyl)-4-(4'-N-chloroethyl-N-methylaminophenyl)pyridine,
2,6-bis(2'-octyloxyphenyl)-4-(4'-N-chloroethyl-N-methylaminophenyl)pyridine,
2,6-bis(2'-methoxyphenyl)-4-(4'-N-ethoxyethyl-N-methylaminophenyl)pyridine,
2,6-bis(2'-ethoxyphenyl)-4-(4'-N-ethoxyethyl-N-methylaminophenyl)pyridine,
2,6-bis(2'-butoxyphenyl)-4-(4'-N-ethoxyethyl-N-methylaminophenyl)pyridine,
2,6-bis(2'-hexyloxyphenyl)-4-(4'-N-ethoxyethyl-N-methylaminophenyl)pyridine,
2,6-bis(2'-octyloxyphenyl)-4-(4'-N-ethoxyethyl-N-methylaminophenyl)pyridine,
2,6-bis(2'-methoxyphenyl)-4-(4'-dibutylaminophenyl)pyridine,
2,6-bis(2'-ethoxyphenyl)-4-(4'-dibutylaminophenyl)pyridine,
2,6-bis(2'-butoxyphenyl)-4-(4'-dibutylaminophenyl)pyridine,
2,6-bis(2'-hexyloxyphenyl)-4-(4'-dibutylaminophenyl)pyridine,
2,6-bis(2'-octyloxyphenyl)-4-(4'-dibutylaminophenyl)pyridine,
2,6-bis(2'-methoxyphenyl)-4-(4'-N-isobutyl-N-ethylaminophenyl)pyridine,
2,6-bis(2'-ethoxyphenyl)-4-(4'-N-isobutyl-N-ethylaminophenyl)pyridine,
2,6-bis(2'-propoxyphenyl)-4-(4'-N-isobutyl-N-ethylaminophenyl)pyridine,
2,6-bis(2'-butoxyphenyl)-4-(4'-N-isobutyl-N-ethylaminophenyl)pyridine,
2,6-bis(2'-pentyloxyphenyl)-4-(4'-N-isobutyl-N-ethylaminophenyl)pyridine,
2,6-bis(2'-hexyloxyphenyl)-4-(4'-N-isobutyl-N-ethylaminophenyl)pyridine,
2,6-bis(2'-heptyloxyphenyl)-4-(4'-N-isobutyl-N-ethylaminophenyl)pyridine,
2,6-bis(2'-octyloxyphenyl)-4-(4'-N-isobutyl-N-ethylaminophenyl)pyridine,
2,6-bis(2'-nonyloxyphenyl)-4-(4'-N-isobutyl-N-ethylaminophenyl)pyridine,
2,6-bis(4'-methoxyphenyl)-4-(4'-dimethylaminophenyl)pyridine,
2,6-dimethyl-3,5-biscarbethoxy-4-(4'-dimethylaminophenyl)pyridine,
2-(2'-octyloxyphenyl)-4-(4'-dimethylaminophenyl)-6-phenylpyridine,
2,6-diethoxy-4-(4'-diethylaminophenyl)pyridine,
4-(4-methoxyphenyl)-2,6-bis(4-dimethylaminophenyl)pyridine,
4-phenyl-2,6-bis(4-dimethylaminophenyl)pyridine,
4-(4-methylphenyl)-2,6-bis(4-dimethylaminophenyl)pyridine,
2,4,6-tris(4-dimethylaminophenyl)pyridine,
4-(2-chloro-4-dimethylaminophenyl)-2,6-bis(4-dimethylaminophenyl)pyridine,
4-(3-nitrophenyl)-2,6-bis(4-dimethylaminophenyl)pyridine,
4-(4-methoxycarbonylphenyl)-2,6-bis(4-dimethylaminophenyl)pyridine,
4-(4-dimethylaminophenyl)-2,6-bis(2-thienyl)pyridine,
4-(4-dimethylaminophenyl)-2,6-bis(2-furyl)pyridine,
4-(2-chloro-4-dimethylaminophenyl)-2,6-bis(2-thienyl)pyridine,
4-[4-(1-piperidinyl)phenyl]-2,6-bis(4-dimethylaminophenyl)pyridine,
4-(4-morpholinophenyl)-2,6-bis(4-dimethylaminophenyl)pyridine,
4-(9-julolidinyl)-2,6-bis(4-dimethylaminophenyl)pyridine,
4-(4-methylphenyl)-2,6-bis(4-dimethylaminophenyl)pyridine,
4-(4-methoxyphenyl)-2,6-bis(4-dimethylaminophenyl)pyridine,
4-(4-methoxyphenyl)-2,6-bis(4-morpholinophenyl)pyridne,
4-(4-fluorophenyl)-2,6-bis(4-dimethylaminophenyl)pyridine,
4-(4-octyloxyphenyl-methylamino)-2,6-diphenylpyridine,
4-(4-chlorophenyl)-2,6-bis(4-dimethylaminophenyl)pyridine,
4-(4-nitrophenyl)-2,6-bis(4-dimethylaminophenyl)pyridine,
4-[4-(2-cyanoethyl)-methylaminophenyl]-2,6-bis(4-dimethylaminophenyl)pyridine,
4-(2,5-dimethoxyphenyl)-2,6-bis(4-dimethylaminophenyl)pyridine,
4-(4-diethylaminophenyl)-2,6-bis(4-dimethylaminophenyl)pyridine,
4-(4-biphenylyl)-2,6-bis(4-dimethylaminophenyl)pyridine,
4-(4-pyrrolidinylphenyl)-2,6-bis(4-dimethylaminophenyl)pyridine,
4-(4-isoindolinylphenyl)-2,6-bis(4-dimethylaminophenyl)pyridine,
4-(2-methyl-4-pyrrolidinylphenyl)-2,6-bis(4-dimethylaminophenyl)pyridine,
4-phenyl-2,6-bis(4-diemthylaminophenyl)pyridine,
4-(4-methylphenyl)-2,6-bis(4-diethylaminophenyl)pyridine,
4-(4-methoxyphenyl)-2,6-bis(4-diethylaminophenl)pyridine,
4-(4-methoxyphenyl)-2,6-bis(4-dibenzylaminophenyl)pyridine,
4-(4-methoxyphenyl)-2,6-bis(4-piperidinylphenyl)pyridine,
4-[2,4-bis(dimethylamino)phenyl]-2,6-bis(4-dimethylaminophenyl)pyridine,
4-(2-ethoxy-4-diethylaminophenyl)-2,6-bis(4-dimethylaminophenyl)pyridine,
4-(2-ethoxycarbonyl-4-diethylaminophenyl)-2,6-bis(4-dimethylaminophenyl)pyridine,
4-(4-benzyl-ethylaminophenyl)-2,6-bis(4-dimethylaminophenyl)pyridine,
4-(4-dimethylaminophenyl)-2,6-diphenylpyridine,
4-[4-(2-cyanoethyl)-benzylaminophenyl]-2,6-diphenylpyridine,
4-(4-dibenzylaminophenyl)-2,6-diphenylpyridine,
4-(4-dimethylaminophenyl)-2,6-bis(4-chlorophenyl)pyridine,
4-(2-methyl-4-dimethylaminophenyl)-2,6-diphenylpyridine,
4-(2-ethyl-4-dimethylaminophenyl)-2,6-diyhenylpyridine,
4-[4-(2-cyanoethyl)-methylaminophenyl]-2,6-diphenylpyridine,
4-(4-methyl-phenylaminophenyl)-2,6-diphenylpyridine,
4-(4-chloroethyl-methylaminophenyl)-2,6-diphenylpyridine, 4-(4-ethoxyethyl-methylaminophenyl)-2,6-diphenylpyridine, and the like.

The preferred quinazoline type compounds as the components (a) include:

2-(4'-dimethylaminophenyl)-4-methoxyquinazoline,
2-(4'-dimethylaminophenyl)-4-phenoxyquinazoline,
2-(4'-dimethylaminophenyl)-4-(4''-nitrophenyloxy)quinazoline,
2-(4'-dimethylaminophenyl)-4-phenylthioquinazoline,
2-(4'-phenylmethylaminophenyl)-4-phenoxyquinazoline,
2-(4'-piperidinophenyl)-4-phenoxyquinazoline,
2-(4'-dimethylaminophenyl)-4-(4''-chlorophenyloxy)quinazoline,
2-(4'-dimethylaminophenyl)-4-(4''-methoxyphenyloxy)quinazoline,
2-(4'-dimethylaminophenyl)-4-(phenylmethylamino)quinazoline,
2-(4'-dimethylaminophenyl)-4-morpholinoquinazoline,
2-(4'-diethylaminophenyl)-4-phenylquinazoline,
2-(4'-diethylaminophenyl)-4-methylquinazoline,
2-(1'-ethyl-2',2',4'-trimethyl-tetrahydroquinolin-6'-yl)-4-phenoxyquinazoline,
2-(1'-ethyl-2',2',4'-trimethyl-tetrahydroquinolin-6'-yl)-4-methoxyquinazoline,
2-(1',2',2',4'-tetramethylhydroquinolin-6-yl)-4-phenoxyquinazoline,
2-(1'-ethyl-2'-methylhydroquinolin-6'-yl-4-phenoxyquinazoline,
2-(1',3'-dimethylindolin-5'-yl)-4-phenoxyquinazoline,
2-(3',4'-dimethylbenzomorpholin-7'-yl)-4-phenoxyquinazoline,
2-(4'-diethylaminophenyl)-4-(2''-phenoxyethoxy)quinazoline,
2-(4'-diethylaminophenyl)-4-(2''-phenylethylaminoethoxy)quinazoline,
2-(4'-dimethylaminophenyl)-4-(2''-morpholinoethoxy)quinazoline,
2-(4-dibenzylaminophenyl)-4-(2''-phenoxyethoxy)quinozoline,
2-(4'-diethylaminophenyl)-4-(2''-phenoxyethylthio)quinazoline,
2-(4'-diethylaminophenyl)-4-[2''-(1-naphthoxy)ethoxy]quinazoline,
2-(3',4'-dimethylbenzomorpholin-7'-yl)-(2''-phenoxyethyloxy)quinazoline, and the like.

The preferred bisquinazoline type compounds as the component (a) include:

4,4'-(ethylenedioxy)-bis[2-(4-diethylaminophenyl)quinazoline],
4,4'-[propylenedioxy(1,3)]-bis[2-(4-diethylaminophenyl)quinazoline],
4,4'-[butylenedioxy(1,3)]-bis[2-(4-diethylaminophenyl)quinazoline],
4,4'-[butylenedioxy(1,4)]-bis[2-(4-diethylaminophenyl)quinazoline],
4,4'-(oxydiethylene)-bis[2-(4-diethylaminophenyl)quinazoline],
4,4'-ethylene-bis[2-(4-piperidinophenyl)qunazoline],
4,4'-ethylene-bis[2-(4-di-n-propylaminophenyl)qunazoline],
4,4'-(ethylenedioxy)-bis[2-(4-di-n-butylaminophenyl)qunazoline],
4,4'-cyclohexylene-bis[2-(4-diethylaminophenyl)quinazoline], and the like.

The electron-accepting compound of the aforementioned component (b) includes compounds having an active proton, pseudo acid compounds (not an acid but behaves as an acid in the composition to allow the component (a) to develop color), compounds having electron hole, and so forth.

The compounds having an active proton are exemplified by compounds having a phenolic hydroxy group including monophenols and polyphenols, which may have a substituent such as alkyl, aryl, acyl, alkoxycarbonyl, carboxyl and esters and amides thereof, and halogen; bis type phenols, tris type phenols, phenol-aldehyde condensation resins, and the like. The compound may be a salt of the phenolic hydroxyl group of the above compounds.

The compounds are specifically exemplified by:

phenol, o-cresol, t-butylcatechol, nonylphenol, n-octylphenol, n-dodecylphenol, n-stearylphenol, p-chlorophenol, p-bromophenol, o-phenylphenol,
4-(1-methylethoxyphenyl)sulfonylphenol,
4-(4-butoxyphenyl)sulfonylphenol,
4-(4-pentyloxyphenyl)sulfonylphenol,
4-(4-hexyloxyphenyl)sulfonylphenol,
4-(4-heptyloxyphenyl)sulfonylphenol,
4-(4-octyloxyphenyl)sulfonylphenol,
n-butyl p-hydroxybenzoate, n-octyl p-hydroxybenzoate,
resorcin, dodecyl gallate,
2,2-bis(4'-hydroxyphenyl)propane,
4,4-dihydroxydiphenyl sulfone,
1,1-bis(4'-hydroxyphenyl)ethane,
2,2-bis(4'-hydroxy-3-methylphenyl)propane,
bis(4-hydroxyphenyl) sulfide,
1-phenyl-1,1-bis(4'-hydroxyphenyl)ethane,
1,1-bis(4'-hydroxyphenyl)-3-methylbutane,
1,1-bis(4'-hydroxyphenyl)-2-methylpropane,
1,1-bis(4'-hydroxyphenyl)-n-hexane,
1,1-bis(4'-hydroxyphenyl)-n-heptane,
1,1-bis(4'-hydroxyphenyl)-n-octane,
1,1-bis(4'-hydroxyphenyl)-n-nonene,
1,1-bis(4'-hydroxyphenyl)-n-decane,
1,1-bis(4'-hydroxyphenyl)-n-dodecane,
2,2-bis(4'-hydroxyphenyl)butane,
2,2-bis(4'-hydroxyphenyl)ethyl propionate,
2,2-bis(4'-hydroxyphenyl)-4-methylpentane,
2,2-bis(4'-hydroxyphenyl)hexafluoropropane,
2,2-bis(4'-hydroxyphenyl)-n-heptane,
2,2-bis(4'-hydroxyphenyl)-n-nonane, and the like.

The aforementioned compounds having a phenolic hydroxyl group are the most effective for the thermochromism characteristics as the component (b). The compounds may be metal salts of the above phenolic compounds, aromatic carboxylic acids and fatty acids of 2 to 5 carbons, metal salts thereof, metal salts of carboxylic acids, and hydrophosphate esters and metal salts thereof, 1,2,3-trizole and derivetives thereof, and the like.

The aforementioned component (c), namely alcohols, ester, and ketones, are explained below. In the case where the compound is enclosed in microcapsules and further subjected to a secondary processing, the compound is preferably of 10 or more carbons for stable retention in the capsule, since a low molecular compound evaporates off from the capsule in high-temperature processing.

The effective alcohols includes aliphatic saturated monohydric alcohols having 10 or more carbons, specifically exemplified by decyl alcohol, undecyl alcohol, dodecl alcohol, tridecyl alcohol, tetradecyl alcohol, pentadecyl alcohol, hexadecyl alcohol, heptadecyl alcohol, octadecyl alcohol, eicosyl alcohol, docosyl alcohol, etc.

The effective esters preferably has 10 or more carbons, including esters derived from any combinations of an aliphatic, alicyclic, or aromatic monocarboxylic acid with an aliphatic, alicyclic, or aromatic monohydric alcohol; esters derived from any combinations of an aliphatic, alicyclic, or aromatic polycarboxylic acid with an aliphatic, alicyclic, or aromatic monohydric alcohol; and esters derived from any combinations of an aliphatic, alicyclic, or aromatic monocarboxylic acid with an aliphatic, alicyclic, or aromatic polyhydric alcohol. The esters are specifically exemplified by ethyl caprylate, octyl caprylate, stearyl caprylate, myristyl caprate, docosyl caprate, 2-ethylhexyl laurate, n-decyl laurate, 3-methylbutyl myristate, cetyl myristate, isopropyl plamitate, neopentyl palmitate, nonyl palmitate, cyclohexyl palmirate, n-butyl stearate, 2-methylbutyl stearate, 3,5,5-trimethylhexyl stearate, n-undecyl stearate, pentadcyl stearate, stearyl stearate, cyclohexylmethyl stearate, isopropyl behenate, hexyl behenate, lauryl behenate, behenyl behenate, cetyl benzoate, stearyl p-tert-butylbenzoate, dimyristyl phthalate, distearyl phthalate, dimyristyl oxalate, dicetyl oxalate, dicetyl malonate, dialuryl succinate, dilauryl glutarate, diundecyl adipate, dilauryl azelate, di(n-nonyl) sebacate, dineopentyl 1,18-octadecylmethylenedicarboxylic acid ester, ethylene-glycol dimyristate, propylene-glycol dilaurate, propylene-glycol distearate, hexylene-glycol dipalmitate, 1,5-pentanediol distearate, 1,2,6-hexanetriol trimyristate, 1,4-cyclohexanediol dicaprate, 1,4-cyclohexanedimethanol dimyristate, xylene-glycol dicaprate, xylene-glycol distearate, etc.

The effective esters also include esters derived from a saturated fatty acid and a branched aliphatic alcohol; esters derived from an unsaturated fatty acid or a branched or substituted saturated fatty acid and an aliphatic alcohol of 16 or more carbons; cetyl butyrate, stearyl butyrate, and behenyl butyrate. These esters are specifically exemplified by 2-ethylhexyl butyrate, 2-ethylhexyl behenate, 2-ethylhexyl myristate, 2-ethylhexyl caprate, 3,5,5-trimethylhexyl laurate, 3,5,5-trimethylhexyl palmitate, 3,5,5-trimethylhexyl stearate, 2-methylbutyl caproate, 2-methylbutyl caprylate, 2-methylbutyl caprate, 1-ethylpropyl palmirate, 1-ethylpropyl stearate, 1-ethylpropyl behenate, 1-ethylhexyl laurate, 1-ethylhexyl myristate, 1-ethylhexyl palmitate, 2-methylpentyl caproate, 2-methylpentyl caprylate, 2-methylpentyl caprate, 2-methylpentyl laurate, 2-methylbutyl steareate, 2-methylbutyl stearate, 3-methylbutyl stearate, 1-methylheptyl stearate, 2-methylbutyl behenate, 3-methylbutyl behenate, 1-methylheptyl stearate, 1-methylheptyl behenate, 1-ethylpentyl caproate, 1-ethylpentyl palmitate, 1-methylpropyl stearate, 1-methyloctyl stearate, 1-methylhexyl stearate, 1,1-dimethylpropyl laurate, 1-methylpentyl caprate, 2-methylhexyl palmitate, 2-methylhexyl stearate, 2-methylhexyl behenate, 3,7-dimethyloctyl laurate, 3,7-dimethyloctyl myristate, 3,7-dimethyloctyl palmitate, 3,7-diemtyloctyl stearate, 3,7-dimethyloctyl behenate, stearyloleate, behenyl oleate, stearyl linolate, behenyl linolate, 3,7-dimethyloctyl erucate, stearyl erucate, isostearyl erucate, cetyl isostearate, stearyl isostearate, 2-methylpentyl 12-hydroxystearate, 2-ethylhexyl 18-bromostearate, isostearyl 2-ketomyristate, 2-ethylhexyl 2-fluoromyristate, etc.

Further, the ester includes carboxylic acid esters having ΔT value (melting point—cloud point) in the range of from 5° C. to 50° C. as disclosed in U.S. Pat. No. 4,720,301, which are effective for color-memory thermochromism with sufficient hysteresis characteristics in a color density-temperature curve. Herein, the hysteresis characteristics means the phenomenon that a loop is formed from a curve showing the dependence of color density on the temperature for the change from a temperature lower than the color changing region to a temperature higher than the region and another curve for the change from the higher temperature to the lower temperature. The above carboxylic acid ester includes esters having a substituted aromatic ring in the molecule; esters derived from a carboxylic acid having unsubstituted aromatic ring and an aliphatic alcohol having 10 or more carbons; esters having a cyclohexyl group in the molecule; esters derived from a fatty acid of 6 or more carbons and an unsubstituted aromatic alcohol or a phenol; esters derived form a fatty acid of 8 or more carbons and a branched aliphatic alcohol; and esters drived from a dicarboxylic acid and an aromatic alcohol or a branched aliphatic alcohol; specifically exemplified by benzyl cinnamate, heptyl stearate, didecyl adipate, dilauryl adipate, dimyristyl adipate, dicetyl adipate, distearyl adipate, trilaurin, trimyristin, tristearin, dimyristin, and distearin.

The fatty acid esters are also effective which are derived from a monohydric alcohol having 9 or more odd number of carbons and an aliphatic carboxylic acid having even number of carbons: e.g., fatty acid esters of total carbon of 17 to 23 derived from n-pentyl alcohol or n-heptyl alcohol and an aliphatic carboxylic acid having 10 to 16 carbons. The specific examples thereof include n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurete, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmirate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanoate, n-undecyl eicosanoate, n-tridecyl eicosanoate, n-pentadecyl eicosanoate, n-nonyl behenate, n-undecyl behenate, n-tridecyl behenate, and n-pentadecyl behenate.

The effective ketone includes aliphatic ketones having 10 or more total carbons, specifically exemplified by 2-decanone, 3-decanone, 4-decanone, 2undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-henicosane, 2-docosanone, laurone, stearone, and the like.

Another ester, alcohol, carboxylic acid ester, ketone, amide, or the like may be added to the above ester or aliphatic ketone exhibiting the hysteresis characteristics in an amount not to affect greatly the hysteresis characteristics (preferably not more than 20 parts by weight to 100 parts of the ester of the present invention for the effective color-memory effect).

The effective ethers are aliphatic ethers having ten or more total carbons, including dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, undecanediol diethyl ether, and the like.

The aforementioned light stabilizer is incorporated in order to prevent photo-deterioration of the reversible thermochromic composition comprising the components (a), (b), and (c) in an amount ranging from 0.3 to 24%, preferably from 0.8 to 16% by weight. As the light stabilizer, the UV absorber intercepts ultraviolet light in the sunlight effectively to prevent photo-degradation of the component (a) caused by photo-excitation. The antioxidant, the singlet oxygen quencher, the superoxide quencher, the ozone quencher, etc. retard the oxidation reaction. In particular, light resistance is remarkably improved by combined use of the UV absorber and the antioxidant and/or the singlet oxygen quencher.

The light stabilizer (component (d)) employed in the present invention is explained below specifically.

The UV absrober includes benzophenone types, salicylate types, cyanoacrylate types, benzotriazole types, and oxalic anilide types of UV absorber.

The benzophenone type UV absorbers are exemplified by:

2,4-hydroxybenzophenone,
2-hydroxy-4-methoxybenzophenone,
2,2'-dihydroxy-4,4'-dimethoxybenzophenone,
2,2',4,4'-tetrahydroxybenzophenone,
2-hydroxy-4-methoxybenzophenone-5-sulfonic acid,
2-hydroxy-4-octyloxybenzophenone,
bis(2-methoxy-4-hydroxy-5-benzoylphenyl)methane,
2-[2'-hydroxy-3',5'-di-t-amylphenyl]benzophenone,
2-hydroxy-4-dedecyloxybenzophenone (trade name: Seesorb 103, produced by Sipuro Kasei K.K.),
2-hydroxy-4-octadecyloxybenzophenone,
2,2'-dihydroxy-4-methoxybenzophenone,
2-hydroxy-4-benzyloxybenzophenone,
2-[2'-hydroxy-3',5'-di-t-amylphenyl]benzophenone, and the like.

The salicylate type UV absorbers are exemplified by:

phenyl salicylate, p-t-butylphenyl salicylate,
p-octylphenyl salicylate,
2,4-di-t-butylphenyl 4-hydroxybenzoate,
4-t-butylphenyl salicylate,
4-octylphenyl salicylate,
resorcinol monobenzoate, and the like.

The cyanoacrylate type UV absorbers are exemplified by:

ethyl 2-cyano-3,3-diphenylacrylate,
2-ethylhexyl 2-cyano-3,3-diphenylacrylate, and the like.

The benzotriazole type UV absorbers are exemplified by:

2-[5-t-butyl-2-hydroxyphenyl]benzotriazole (trade name: Tinuvin-PS, produced by Ciba Geigy Co.),
2-[5-methyl-2-hydroxyphenyl]benzotriazole,
2-[2-hydroxy-3,5-bis(a,a-dimethylbenzyl)phenyl]-2H-benzotriazole,
2-[3,5-di-t-butyl-2-hydroxypehnyl]benzotriazole,
2-[3-t-butyl-5-methyl-2-hydroxyphenyl]-5-chlorobenzotriazole,
2-[3,5-di-t-butyl-2-hydroxyphenyl]-5-chlorobenzotriazole,
2-[3,5-di-t-amyl-2-hydroxyphenyl]benzotriazole (trade name: Tinuvin 328, produced by Ciba Geigy Co.),
condensate of methyl-3-[3-t-butyl-5-(2H-benzotriazol-2-yl)-4-hydroxyphenyl]propionate and polyethyleneglycol (molecular weight: 300), (trade name: Tinuvin 1130, produced by Ciba Geigy Co.),
2-[3-dodecyl-5-methyl-2-hydroxyphenyl]benzotriazole (trade name: Tinuvin 171, produced by Ciba Geigy Co.),
condensate of methyl-3-[3-(2H-benzotriazol-2-yl)-5-t-butyl-4-hydroxyphenyl]propionate and polyethyleneglycol (molecular weight: 300), (trade name: Tinuvin 1130, produced by Ciba Geigy Co.),
2-[3-t-butyl-5-propyloxycarbonylethyl-2-hydroxyphenyl]-5-chlorobenzotriazole,
2-[2-hydroxyphenyl-3,5-di-(1,1'-dimethylbenzyl)phenyl]-2H-benzotriazole,
2-[2-hydroxy-5-t-octylphenyl]-2H-benzotriazole,
2-[3-t-butyl-5-octyloxycarbonylethyl-2-hydroxyphenyl]benzotriazole (trade name: Tinuvin 384, produced by Ciba Geigy Co.),
2-[2-hydroxy-5-tetraoctylphenyl]benzotriazole,
2-[2-hydroxy-4-octyloxyphenyl]benzotriazole,
2-[2'-hydroxy-3',-(3",4",5",6"-tetrahydrophthalimidomethyl)- 5'-methylphenyl]benzotriazole,
2-(2-hydroxy-5-t-butylphenyl)-benzotriazole, and the like.

The oxalic anilide type UV absorbers are exemplified by:

ethanediamido-N-(2-ethoxyphenyl)-N'-(4-isododecylphenyl),
2,2,4,4-tetrametyl-20-(β-lauryloxycarbonyl)ethyl-7-oxa-3,20-diazadispiro[5.1.11.2]heneicosane-21-one, The antioxidants include hindered amine types, phenol types, sulfur types, phosphorus acid types of antioxidant.

The hindered amine type antioxidants are exemplified by:

dimethyl succinate 1-(2-hydroxyethyl)-4-hydroxy- 2,2,6,6-tetramethylpiperidine polycondensate (trade name: Tinuvin 620LD, produced by Ciba Geigy Co.),
poly[{(6-(1,1,3,3-tetramethylbutyl)imino-1,3-5-triazin- 2,4-diyl}{(2,2,6,6-tetramethyl-4-piperidyl)imino}hexamethylene{2,2,6,6-tetramethyl-4-piperidyl)imino}],
bis(1,2,2,6,6-pentamethyl-4-piperidyl) 2-(3,5-di-t-butyl-4-hydroxybenzyl)-2-n-butylmalonate,
N,N'-bis(3-aminopropyl)ethylenediamine-2,4-bis[N-butyl-N-(1,2,2,6,6-pentamethyl-4-piperidyl)amino]-6-chloro-1,3,5-triazine condensate,
bis[1,2,2,6,6-pentamethyl-4-piperidyl]sebacate,
-benzoyloxy-2,2,6,6-tetramethylpiperidine,
bis(2,2,6,6-tetramentyl-4-piperidyl) sebacate,
8-acetyl-3-dodecyl-7,7,9,9-tetramethyl-1,3,8-triazaspiro[4.5]decane-2,4-dione, and the like.

The phenol type antioxidants are exemplified by:

2,6-di-t-butyl-4-methylphenol,
2-t-butyl-4-methoxyphenol,
2,6-di-t-butyl-4-ethylphenol,
octadecyl 3-(3,5-di-t-butyl-4-hydroxyphenyl)propionate,
2,2-methylenebis(4-methyl-6-t-butylphenol),
4,4-thiobis(2-methyl-6-t-butylphenol),
2,2-thiobis(4-methyl-6-t-butylphenol), 4,4-butylidenebis(3-methyl-6-t-butylphenol),
3,9-bis[1,1-dimethyl-2-{β-(3-t-butyl-4-hydroxy-5-methylphenyl}propionyloxy}ethyl]-2,4,8,10-tetraoxas-piro[5.5]undecane,
1,1,3-tris(2-methyl-4-hydroxy-5-t-butylphenyl)butane,
1,3,5-trimethyl-2,4,6-tris(3,5-di-t-butyl-4-hydroxybenzyl) benzene,
tetrakis[methylene-3-(3,5-di-t-butyl-4-hydroxyphenyl)propionate]methane,
2,2-ethylenebis(4,6-di-t-butylphenol),
bis[3,3'-bis-(4'-hydroxy-3',-t-butylphenyl)butyric acid] glycol ester,
1,3,5-tris(3',5'-di-t-butyl-4'-hydroxybenzyl)-s-triazine- 2,4, 6-(1H,3H,5H)trione,
tocopherol,
1,3,5-tris(4-t-butyl-3-hydroxy-2,6-dimethylbenzyl) isocyanurate,
pentaerythritol-teterakis(3-laurylthiopropionate),
triethyleneglycol-bis[3-(3-t-butyl-5-methyl-4-hydroxyphenyl)propionate] (trade name: IRGANOX 245, produced by Ciba Geigy Co.),
1,6-hexanediol-bis[3-(3,5-di-t-butyl-4-hydroxyphenyl)propionate], 2,2-thioethylene-bis[3-(3,5-di-t-butyl-4hydroxyphenyl)propionate]
N,N'-hexamethylene-bis(3,5-di-t-butyl-4-hydroxy-hydrocinnamide),
tris-(3,5-di-t-butyl-4-hydroxybenzyl) isocyanurate,
polymerized-2,2,4-trimethyl-1,2-dihydroquinoline, styrenated-phenol,
2,5-di-t-butylhydroquinone,
bis(2,2,6,6-tetramethyl-4-piperidyl) sebacate,
2,4-bis-(n-octylthio)-6-(4-hydroxy-3,5-di-t-butylanilino)-1,3,5-triazine, and the like.

The sulfur type antioxidants are exemplified by:

dilauryl 3,3'-thiodipropionate,
dimyristyl 3,3'-thiodipropionate,
distearyl 3,3'-thiodipropionate,
stearyl thiopropylamide, and the like.

The phosphorus acid type antioxidants are exemplified by:

tris(2,4-di-t-butylphenyl) phosphite,
bis(2,4-di-t-butylphenyl)pentaerythritol diphosphite,
3,5-di-t-butyl-4-hydroxybenzyl phosphonate diethyl ester,
triphenyl phosphite,
diphenylisodecyl phosphite,
phenylisodecyl phosphite,
4,4'-butylidene-bis(3-methyl-6-t-butylphenyl-ditridecyl)phosphite,
octadecyl phosphite,
tris(nonylphenyl) phosphite,
diisodecylpentaerythritol diphosphite,
9,10-dihydro-9-oxa-10-phosphaphenanthrene,
10-(3,5-di-t-butyl-4-hydroxybenzyl)-9,10-dihydro-9-oxa-10-phosphaphenanthrene-10-oxide,
10-decyloxy-9,10-dihydro-9-oxa-10-phosphaphenanthrene,
cyclic-neopentan-tetrayl-bis(2,4-di-t-butylphenyl) phosphite,
cyclic-neopentan-tetrayl-bis(2,4-di-t-butyl-4-methylphenyl) phosphite,
2,2-methylenebis(4,6-di-t-butylphenyl)octyl phosphite, and the like.

The singlet oxygen quenchers include carotins, dyes, amines, phenols, nickel complexes, sulfides, and the like, and are exemplified specifically by:

1,4-diazabicyclo[2.2.2]octane (DABCO), β-carotin, 1,3-cyclohexadiene, 2-diethylaminomethylfuran,
2-phenylaminomethylfurane,
9-diethylaminomethylanthrecene,
5-diethylaminomethyl-6-phenyl-3,4-dihydroxypyran,
nickel dimethyldithiocarbamate,
nickel 3,5-di-t-butyl-4-hydroxybenzyl-O-ethylphosphanate,
nickel 3,5-di-t-butyl-4-hydroxybenzyl-O-butylphosphanate,
nickel [2,2'-thiobis(4-t-octylphenolate)](n-butylamine),
nickel [2,2'-thiobis(4-t-octylphenolate)](2-ethylhexylamine),
nickel bis[2,2'-thiobis(4-t-octylphenolate)],
nickel bis[2,2'-sulfone-bis(4-t-octylphenolate)],
nickel bis[2-hydroxy-5-methoxyphenyl-N-n-butylaldimine],
nickel bis(dithiobenzyl),
nickel bis(dithiobiacetyl), and the like.

The superoxide anion quenchers include complexes of superoxide dismutase with cobalt, and nickel, and the like.

The ozone quenchers include:

4,4'-thiobis(6-t-butyl-m-cresole), 2,4,6-tri-t-butylphenol, 1,4-diazabicyclo[2.2.2]octane, N-phenyl-β-naphthylamine, α-tocopherol, 4,4'-methylene-bis( 2,6-di-t-butylphenol), p,p'-diaminodiphenylmethane, 2,2'-methylene-bis(6-t-butyl-p-cresol), N,N'-diphenyl-p-phenylenediamine, N,N'-diphenylethylenediamine, N-isopropyl-N'-phenyl-p-phenylenediamine, and the like.

The infrared absorbers include compounds which have the absorption maximum at near infrared region of 700 to 2000 nm, and do not exhibit a large absorption in the visible region of 400 to 700 nm: being exemplified by the compounds represented by the formulas below:

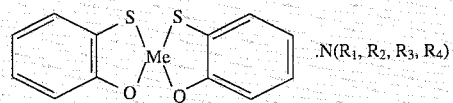

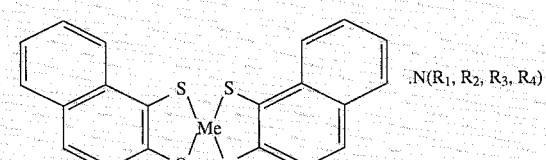

where $R_1$, $R_2$, $R_3$, and $R_4$ are respectively an alkyl group; X is a halogen atom or a hydrogen atom; and Me is nickel, palladium, or platinum,

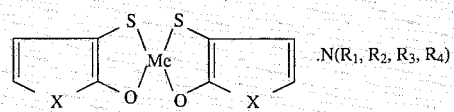

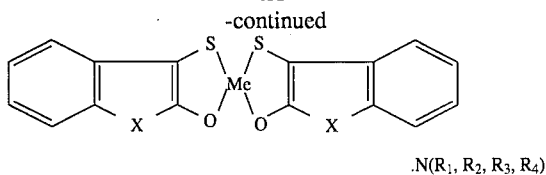

.N(R₁, R₂, R₃, R₄)

where R₁, R₂, R₃, and R₄ are respectively an alkyl group; Me is nickel, palladium, or platinum; and X is a carbon atom, an oxygen atom, or a sulfur atom,

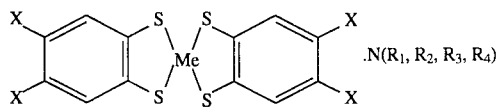

.N(R₁, R₂, R₃, R₄)

where R₁, R₂, R₃, and R₄ are respectively an alkyl group; X is a halogen atom or a hydrogen atom; and Me is nickel, palladium, or platinum,

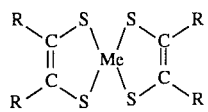

where R is a hydrogen atom, an alkyl group, a phenyl group, an alkyl- or alkoxy-substituted phenyl group, or a thienyl group; and Me is nickel, palladium, or platinum,

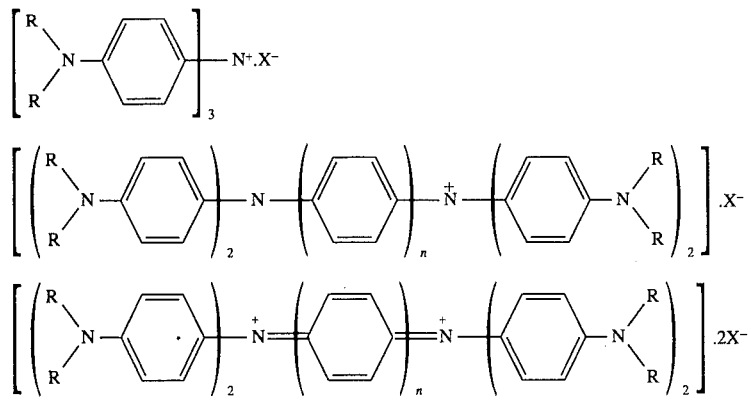

where R an alkyl; X is an anion selected from perchlorate ($ClO_4^-$), fluoroborate ($BF_4^-$), trichloroacetate ($Cl_3COO^-$), trifluoroacetate ($CF_3COO^-$), picrate [$(NO_3)_3C_6H_2O^-$], hexafluoroarsenate ($AsF_6^-$), hexachloroantimonate ($SbCl_6^-$), hexafluoroantimonate ($SbF_6^-$), benzenesulfonate ($C_6H_5SO_3^-$), alkylsulfonate ($RSO_3^-$), phosphate ($PO_4^{3-}$), sulfate ($SO_4^{2-}$), chloride ($Cl^-$), and bromide ($Br^-$), and the like compounds.

A microcapsule pigment is obtained by enclosing, in microcapsules, the homogeneous solubilized mixture of the composer&on composed of the essential three components (a), (b), and (c), or the composition containing four components of (a), (b), (c), and (d) by a known microcapsule technique.

A larger ΔH value can be obtained by the microparticulate composition (in a size of 0.5 to 50 μm, preferably 1 to 30 μm) in comparison with a non-particulate form. Further, the composition is protected by the capsule wall against chemically active substances such as acidic substances, basic substances, peroxides, etc. and solvents to maintain the inherent properties of the composition and to give heat stability.

The available microcapsule formation technique includes interfacial polymerization, in-situ polymerization, solution-curing coating, phase separation from an aqueous solution, phase separation from an organic solvent solution, melt-dispersion cooling, gas suspension coating, spray drying, and so forth. The technique is suitably selected for the purpose. The surface of the microcapsules may be further coated by a secondary film of a resin to give durability to the microcapsules or to improve the surface properties for practical use.

The electron-donating color-developing organic compound (a) selected from pyridine types, quinazoline types and bisquinzoaline types of compounds serves as a color developer of a desired color density by electron exchange reaction with the electron-accepting compound. The component (c) serves as a color-change temperature controller to cause the reversible electron-exchange reaction at a desired temperature range to form fluorescent, high color-density, bright and sharp color under a color developing conditions, and to give no color under a non-color-developing conditions without residual color. Such properties cannot be achieved by the conventional systems employing, as the component (a), a compound selected from alkoxyfluoran types, bis(dialkylaminophenyl)ketone types, diketopyridine types, and styrylquinone types of yellow-color compounds.

The specified ester compound or the specified aliphatic carboxylic acid as the component (c) enables color change with a favorable hysteresis characteristics regarding a color-density-temperature dependence to exhibit color-memorizing thermochromic properties.

The reversible thermochromic composition of the present invention is protected by a light stabilizer from deterioration of the electron-donating color-developing organic compound. In particular, combined use of the UV absorber with one or more of the light stabilizer selected from antioxidants, a singlet oxygen quenchers, superoxide anion quenchers, ozone quenchers, and infrared light absorbers improves effectively the light resistance by absorption of at least a portion of ultraviolet light and visible light to retard the light deterioration and the oxidation reaction of the electron-donating color-developing organic compound.

EXAMPLES

The examples 1 to 32 of the composition of the present invention are shown in Tables 1 to 3 regarding the components, color change, and color-change temperatures. In the Tables the numerals in parentheses show the parts by weight.

The aforementioned compositions may be enclosed in microcapsules to form a microcapsular pigment.

For instance, 10 parts of Epon 828 (an epoxy resin, produced by Yuka Shell Epoxy K.K.) was dissolved in 70 parts of the composition of Example 4 by heating at 100° C.. This solution was added dropwise into 100 parts of aqueous 10% gelatin solution, and was stirred to form fine droplet thereof. Thereto, a solution of 5 parts of a curing agent Epicure U (an epoxy resin amine adduct, produced by Yuka Shell Epoxy K.K.) in 45 parts of water was added gradually, and the mixture was stirred for about 5 hours at 80° C. to obtain a microcapsule suspension. The resulting microcapsules were collected by centrifugation. The microcapsular composition had fluorescent bright yellow color below 50° C., and turned colorless above 50° C. similarly as the base composition of Example 4. The color change was reversible.

In the same manner as above, a composition of Example 5 was enclosed in microcapsules. The resulting microcapsular composition was fluorescent bright yellow below 15° C., the fluorescent yellow color was maintained at ordinary temperature range (18° C. to 28° C.), and lost the fluorescent yellow color and became colorless above 32° C. similarly as the base composition of Example 5. This color change was reversible.

In the same manner as above, a composition of Example 13 was enclosed in microcapsules. The resulting microcapsular composition was fluorescent bright yellow below 50° C., and turned colorless above 50° C. similarly as the base composition of Example 13. This color change was reversible.

In the same manner as above, a composition of Example 16 was enclosed in microcapsules. The resulting microcapsular composition was fluorescent bright yellow below 15° C. The fluorescent yellow color was retained at ordinary temperature range (18 to 28° C.), and lost the fluorescent yellow color and became colorless above 32° C. similarly as the base composition of Example 16. This color change could be reproduced repeatedly. Application Example 1

Screen printing inks were prepared respectively from a microcapsular thermochromic color-memory composition A which changes the color reversibly between cyan and non-color (lower color change point: 15° C., higher color change point 32° C.); a microcapsular thermochromic color-memory composition B which changes the color reversibly between magenta and non-color (lower color change point: 15° C., higher color change point: 32° C.); and a microcapsular thermochromic color memory composition C which changes the color reversibly between black and non-color (lower color change point: 15° C., higher color change point: 32° C.). A colored landscape was screen-printed by use of four-color screens on a white art paper to obtain a color print. At a temperature below 15° C., the color photograph of the landscape came to be developed. Within the ordinary temperature range (18° C. to 28° C.), the color photograph was retained. On heating up to 32° C. or higher, the color photograph disappeared to give white color. This white state was maintained in the ordinary temperature range. The changes could be reproduced repeatedly. Addition of a light stabilizer to the microcapsules improved the light resistance of the color print remarkably in comparison with the print without the light stabilizer.

The above microcapsular thermochromic color memory compositions A, B, and C were prepared by enclosing the compositions below with an epoxy resin film by conventional interfacial polymerization.

| (Microcapsular Composition A) | |
|---|---|
| 3-(4-diethylaminophenyl)-3-(1-ethyl-2-methylindol-3-yl)-phthalide | 2 parts |
| 2,2-bis(4'-hydroxyphenyl)propane | 6 parts |
| neopentyl stearate | 50 parts |
| (Microcapsular Composition B) | |
| 1,2-benzo-6-methylaminofluoran | 1.5 parts |
| 2,2-bis(4'-hydroxyphenyl)propane | 6 parts |
| neopentyl stearate | 50 parts |
| (Microcapsular Composition C) | |
| 2-anilino-3-methyl-6-dibutylaminofluoran | 3 parts |
| 2,2-bis(4'-hydroxyphenyl)propane | 6 parts |
| neopentyl stearate | 50 parts |

Application Example 2

Paints were prepared respectively with the microcapsular thermochromic composition of Example 25 and a microcapsular thermochromic composition D which changes the color reversibly between cyan and non-color (color change point: 30° C.). The paints were sprayed on a white polyvinyl chloride ball such that the paints partially overlapped to obtain a thermochromic ball having a continuous gradation pattern.

This thermochromic ball showed, below 30° C., a gradation pattern of yellow color, cyan color, and green color formed by mixing of yellow and cyan. The ball, when heated above 30° C., lost the colors of yellow, cyan, and green to turn white. When the ball was cooled below 30° C., the ball developed the colors of yellow, cyan, and green. This color change was reproduced repeatedly. The light resistance was improved remarkably by the light stabilizer in comparison with the microcapsular composition without a light stabilizer.

The above microcapsular thermochromic color memory composition D was prepared by enclosing the compositions below with an epoxy resin film by a know interfacial polymerization.

| (Microcapsular Composition D) | |
|---|---|
| 3-(4-diethylaminophenyl)-3-(1-ethyl-2-methylindol-3-yl)-phthalide | 1.5 parts |
| 2,2-bis(4'-hydroxyphenyl)propane | 5 parts |
| stearyl caprate | 50 parts |

Application Example 3

The thermochromic composition of Example 23 was enclosed in microcapsules by conventional interfacial polymerization of an epoxy resin/amine curing agent. 20 Parts of the resulting microcapsular thermochromic composition, and 1000 parts of polypropylene having a Vicat softening point of 100° C. were mixed uniformly. The mixture was formed into thermochromic pellets of 2 to 3 mm in diameter by means of an extruder at a cylinder temperature of 165° C. and a gate temperature of 160° C. in a conventional manner.

The thermochromic pellets were formed into a miniature car body of 10 cm long, 3.7 cm wide, and 3 mm thick by means of an injection machine at a cylinder temperature of 170° C. The formed body was fluorescent yellow below 15° C., and colorless above 15° C. On cooling to a temperature below 15° C., the body again assumed fluorescent yellow. This color change could be repeated. The light resistance was remarkably improved in comparison with a separately and similarly formed miniature car body without a light stabilizer.

(Light Resistance Test Method)

With a test sample before light exposure, the light absorbances in a colored state and in a non-colored state at the maximum absorption wavelength by means of a spectrophotometer (manufactured by Hitachi, Ltd.). The difference of the absorbance was taken as "100%". The absorbances at the colored state were measured after light exposure for 0, 4, 8, 12, 16, and 20 hours to obtain the ratios of decrease of the absorbance in comparison with the above 100% value. The light exposure was conducted with a carbon ark fade meter in the above test.

(Summary of Light Resistance Test of Examples and Comparative Examples)

Table 4 shows the results of the light resistance tests of the samples of Examples 12 to 32 and Comparative Examples 1 to 21 containing the components (a), (b), and (c) but not containing component (d) of Examples.

The reversible thermochromic composition of the present invention, as described above, has characteristics that it develops fluorescent bright color of yellow, yellowish orange, reddish orange, red, etc. with high color density under color developing conditions, and loses the color without residual color under non-color developing conditions. This reversible thermochromic composition gives novel practical coloring materials, and enables various applications in addition to conventional thermochromic materials. Mixing with other thermochromic materials, e.g., of blue, green, orange, pink, etc., gives fluorescent bright color of blue, green, orange, vermilion, red, etc.

Irradiation of ultraviolet light in the dark visualizes color change of the fluorescence light.

Enclosure of the composition in microcapsules gives a microcapsule pigment for printing inks, paints, and other coloring materials. Melt-blending of the composition with a thermoplastic material enables production of various molded products.

Addition of a light stabilizer to the composition remarkably improves the light resistance, and maintains perpetually the color changing properties of the reversible thermochromic composition.

The reversible thermochromic composition is useful in various application fields such as toys, ornaments, teaching aids, stationery materials, textile goods, household materials, sporting goods, outdoor and indoor apparatuses, clothes, printing matters, and so forth.

TABLE 1

| Example | Component (a) | Component (b) | Component (c) | Color change Change temperature |
|---|---|---|---|---|
| 1 | 2,6-diphenyl-4-(4'-dimethylaminophenyl)pyridine (2) | 2,2-bis(4'-hydroxyphenyl)propane (8) | myristyl alcohol (25) butyl stearate (25) | fluorescent yellow ←→ colorless 15° C. |
| 2 | 2,6-diethoxy-4-(4'-diethylphenyl)-pyridine (2) | lauryl gallate (8) | butyl myristate (50) | fluorescent yellow ←→ colorless −18° C. |
| 3 | 2-(2'-octyloxyphenyl)-4-(4'-dimethylaminophenyl)-6-phenylpyridine (2) | bis(4-hydroxyphenyl)sulfide (8) | n-stearyl alcohol (50) | fluorescent yellow ←→ colorless 50° C. |
| 4 | 2-(2'-octyloxyphenyl)-4-(4'-dimethyaminophenyl)-6-phenylpyridine (2) | 2,2-bis(4'-hydroxyphenyl)hexafluoropropane (10) | stearyl caprate (50) | fluorescent yellow ←→ colorless 30° C. |
| 5 | 2-(2'-octyloxyphenyl)-4-(4'-dimethyaminophenyl)-6-phenylpyridine (2) | 2,2'-methylene-bis(4-chlorophenol) (10) | neopentyl stearate (50) | fluorescent yellow ←→ colorless 15° C., 32° C. |
| 6 | 4-(4-methoxyphenyl)-2,6-bis(4-dimethylaminophenyl)pyridine (2) | bis(4-hydroxyphenyl) sulfone (6) | nonyl caprate (50) | fluorescent yellow ←→ colorless −7° C., 12° C. |
| 7 | 2,4,6-tris(4-dimethylaminophenyl)-pyridine (2) | tetrabromobisphenol A (8) | 2-ethylhexyl caprate (50) | fluorescent orange ←→ colorless −30° C. |
| 8 | 2-(4'-dimethylaminophenyl)-4-methoxyquinazoline (2) | 2,2-bis(4'-hydroxyphenyl)-4-methylpentane (8) | trilaurin (50) | fluorescent yellow ←→ colorless 10° C., 40° C. |
| 9 | 2-(4'-dimethylaminophenyl)-4-(4"-nitrophenyl)oxyquinazoline (2) | 2,2'-methylene-bis(3,4,6-trichlorophenol) (8) | 1,10-decanediol (50) | fluorescent orange ←→ colorless 70° C. |
| 10 | 2-(4'-diethylaminophenyl)-4-phenylquinazoline (2) | 2,2'-methylene-bis(4-chlorophenol) (10) | stearyl butyrate (50) | fluorescent red ←→ colorless 20° C. |
| 11 | 4,4'-(ethylenedioxy)bis[2-(4-diethylaminophenyl)quinazoline (2) | 2,2-bis(4'-hydroxyphenyl)butane (10) | 9-heptadecanone (25) cetyl alcohol (25) | fluorescent yellow ←→ colorless 35° C. |

TABLE 2

| Example | Component (a) | Component (b) | Component (c) |
|---|---|---|---|
| 12 | 2,6-diphenyl-4-(4'-dimethylaminophenyl)pyridine (3) | 2,2-bis(4'-hydroxyphenyl) hexafluoropropane (8) | neopentyl stearate (50) |
| 13 | 2,6-diethoxy-4-(4'-diethylaminophenyl)pyridine (3) | 2,2'-methylene-bis(3,4,6-trichlorophenol) (10) | n-stearyl alcohol (50) |

TABLE 2-continued

| Example | Component (a) | Component (b) | Component (c) |
|---|---|---|---|
| 14 | 2,6-bis(2'-ethoxyphenyl)-4-(4'-dimethylaminophenyl)-pyridine (3) | 2,2-bis(4'-hydroxyphenyl)-hexafluoropropane (8) 4-(1-methylethoxyphenyl)-sulfonylphenol (2) | n-stearyl alcohol (50) |
| 15 | 2-(2'-octyloxyphenyl)-4-(4'-dimethylaminophenyl)-6-phenylpyridine (3) | 2,2'-methylene-bis(4-chlorophenol) (10) | neopentyl stearate (50) |
| 16 | 2,6-bis(2'-butyloxyphenyl)-4-(4'-diethylaminophenyl)-pyridine (3) | 2,2'-methylene-bis(4-chlorophenol) (10) | neopentyl stearate (50) |
| 17 | 4-(4-methoxyphenyl-2,6-bis-(4-dimethylaminophenyl)-pyridine (3) | tetrabromobisphenol A (8) bis(4'-hydroxyphenyl sulfone (2) | myristyl alcohol (25) butyl stearate (25) |
| 18 | 2,6-bis(2'-methoxyphenyl)-4-(4'-diethylaminophenyl)-pyridine (3) | 2,2-bis(4'-hydroxyphenyl-hexafluoropropane (8) | 2-ethylhexyl caprate (50) |
| 19 | 2-(4'-dimethylaminophenyl)-4-methoxyquinazoline (3) | lauryl gallate (8) | butyl myristate (50) |
| 20 | 2,6-bis(2'-propyloxyphenyl)-4-(4'-N-isobutyl-N-ethyl-aminophenyl)pyridine (3) | 2,2'-methylene-bis-(3,4,6-trichlorophenol) (10) | 1,10-decanediol (50) |
| 21 | 2-(4'-diethylaminophenyl)-4-phenylquinazoline (3) | 2,2'-methylene-bis-(3,4,6-trichlorophenol) (10) | 9-heptadecanone (25) cetyl alcohol (25) |
| 22 | 4,4'-(ethyelnedioxy)-bis-[2-(4-diethylaminophenyl)quinazo-line] (3) | 4-(1-methylethoxy-phenyl)sufonylphenol (8) | myristyl alcohol (25) butyl stearate (25) |

| Example | Component (d) | Color change Change temperature |
|---|---|---|
| 12 | 8-acetyl-3-dodecyl-7,7,9,9-tetramethyl-1,3-8-triazaspiro-[4.5]decane-2,4-dione (0.5) 2-(5-t-butyl-2-hydroxyphenyl)benzotriazole (1) | fluorescent yellow ←→ colorless 15° C., 32° C. |
| 13 | nickel 3,5-di-t-butyl-14-hydroxybenzyl-O-butylphos-phonate (0.2) 2-(5-t-butyl-2-hydroxyphenyl)benzotriazole (1) | fluorescent yellow ←→ colorless 50° C. |
| 14 | bis(2,2,6,6-tetramethyl-4-piperidyl) sebacate (0.5) 2-(3-t-butyl-5-methyl-2-hydroxyphenyl-5-chloro-benzotriazole (3) triethyleneglycol-bis[3-(3-t-butyl-5-methyl-4-hydroxy-phenyl) propionate] (0.5) | fluorescent yellow ←→ colorless 50° C. |
| 15 | nickel bis(dithiobenzyl) (0.2) 2-(5-t-butyl-2-hydroxyphenyl)benzotriazole (1) | fluorescent yellow ←→ colorless 15° C., 32° C. |
| 16 | 2,2,4,4-tetramethyl-20-(β-lauryl-oxycarbonyl)ethyl-7-oxa-3,20-diazaspiro[5.1.11.2]heneicosane-21-one (0.5) 2-(5-t-butyl-2-hydroxyphenyl)benzotriazole (1) | fluorescent yellow ←→ colorless 15° C., 32° C. |
| 17 | 2-(3,5-di-t-butyl-4-hydroxybenzyl)-2-n-butyl malonic acid bis (1,2,2,6,6-pentamethyl-4-piperidyl) (0.5) 2-(3,5-di-t-amyl-2-hydroxyphenyl)benzotriazole (1) | fluorescent yellow ←→ colorless 15° C. |
| 18 | 2-(3,5-di-t-butyl-4-hydroxybenzyl)-2-n-butyl malonic acid bis (1,2,2,6,6-pentamethyl-4-piperidyl) (0.5) 2-(3,5-di-t-amyl-2-hydroxyphenyl)benzotriazole (1) | fluorescent yellow ←→ colorless −30° C. |
| 19 | 2-(3-t-butyl-5-methy-2-hydroxyphenyl-5-chloro-benzotriazole (3) | fluorescent yellow ←→ colorless −18° C. |
| 20 | 4-benzoyloxy-2,2,6,6-tetramethylpiperidine (1) 2-(3-t-butyl-5-methyl-2-hydroxyphenyl-5-chloro-benzotriazole (3) | fluorescent yellow ←→ colorless 70° C. |
| 21 | nickel 3,5-di-t-butyl-4-hydroxybenzyl-O-butyl phosphonate (0.2) 2-(3,5-di-t-amyl-2-hydroxyphenyl)benzotriazole (1) | fluorescent red ←→ colorless 35° C. |
| 22 | nickel 3,5-di-t-butyl-4-hydroxybenzyl-O-butyl phosphonate (0.2) 2-(3,5-di-t-amyl-2-hydroxyphenyl)benzotriazole (1) | fluorescent yellow ←→ colorless 15° C. |

TABLE 3

| Example | Component (a) | Component (b) | Component (c) |
|---|---|---|---|
| 23 | 2,6-bis(2'-octyloxyphenyl)-4-(4'-dimethylaminophenyl-pyridine (3) | 2,2-bis(4'-hydroxyphenyl) propane (8) lauryl gallate (2) | myristyl alcohol (25) butyl stearate (25) |
| 24 | 2,6-bis(2'-butoxyphenyl)-4-(4'-dimethylaminophenyl)-pyridine (3) | lauryl gallate (8) | butyl myristate (50) |
| 25 | 2-(2'-octyloxyphenyl)-4-(4'- | bis(4'-hydroxyphenyl) | stearyl caprate (50) |

TABLE 3-continued

| Example | | | |
|---|---|---|---|
| | dimethylaminophenyl)-6-phenylpyridine (3) | sulfide (8) | |
| 26 | 2,6-bis(2'-methoxyphenyl)-4-(4'-dimethylaminophenyl)-pyridine (3) | 4-(1-methoxyphenyl)-sulfonylphenol (8) | stearyl caprate (50) |
| 27 | 2,6-bis(2'-ethoxyphenyl)-4-(4'-diethylaminophenyl)-pyridine (3) | bis(4'-hydroxyphenyl) sulfone (10) | nonyl caprate (50) |
| 28 | 2,4,6-tris(4-dimethylamino-phenyl)pyridine (3) | 2,2-bis(4'-hydroxyphenyl)-hexafluoropropane (8) | nonyl caprate (50) |
| 29 | 2,6-bis(2'-butoxyphenyl)-4-(4'-N-isobutyl-N-ethylamino-phenyl)pyridine (3) | 4-(1-methylethoxyphenyl)-sulfonylphenol (8) | trilaurin (50) |
| 30 | 2-(4'-dimethylaminophenyl)-4-(4'-nitrophenyl)-oxyquin-azoline (3) | 2,2-bis(4'-hydroxyphenyl) propane (8) | stearyl caprate (50) |
| 31 | 2,6-bis(2'-ethoxyphenyl)-4-(4'-N-isobutyl-N-ethylamino-phenylpyridine (3) | tetrabromo-bisphenol A (10) | stearyl butyrate (50) |
| 32 | 2,6-bis(2'-methoxyphenyl)-4-(4'-N-isobutyl-N-ethylamino-phenyl)pyridine (3) | 2,2-bis(4'-hydroxyphenyl)-butane (8) | 9-heptadecanone (25) cetyl alcohol (25) |

| Example | Component (d) | Color change / Change temperature |
|---|---|---|
| 23 | 4-benzoyloxy-2,2,6,6-tetramethylpiperidine (0.5) 2,2'-dihydroxy-4,4'-dimethoxybenzophenone (1) pentaerythrityl-tetrakis[3-(3,5-di-t-butyl-5-methyl-4-hydroxyphenyl)propionate] (0.5) | fluorescent yellow ←→ colorless 15° C. |
| 24 | 4-benzoyloxy-2,2,6,6-tetramethylpiperizine (1) 2-(3-t-butyl-5-methyl-2-hydroxyphenyl-5-chloro-benzotriazole (3) | fluorescent yellow ←→ colorless −18° C. |
| 25 | 8-acetyl-3-dodecyl-7,7,9,9-tetramethyl-1,3,8-triazaspiro-[4.5]decane-2,4-dione (0.5) 2-(3,5-di-t-amyl-2-hydroxyphenyl)benzotriazole (1) | fluorescent yellow ←→ colorless 30° C. |
| 26 | 8-acetyl-3-dodecyl-7,7,9,9-tetramethyl-1,3,8-triazaspiro-[4.5]decane-2,4-dione (0.5) 2-(3,5-di-t-amyl-2-hydroxyphenyl)benzotriazole (1) | fluorescent yellow ←→ colorless 30° C. |
| 27 | 2-(3,5-di-t-butyl-4-hydroxybenzyl)-2-n-butyl malonic acid bis(1,2,2,6,6-pentamethyl-4-piperidyl) (0.5) 2-(5-t-butyl-2-hydroxyphenyl)benzotriazole (1) | fluorescent yellow ←→ colorless −7° C., 12° C. |
| 28 | 2-(3,5-di-t-butyl-4-hydroxybenzyl)-2-n-butyl malonic acid bis(1,2,2,6,6-pentamethyl-4-piperidyl) (0.5) 2,2'-dihydroxy-4,4'-dimethoxybenzophenone (1) | fluorescent yellow ←→ colorless −7° C., 12° C. |
| 29 | 4-benzoyloxy-2,2,6,6-tetramethylpiperidine (0.5) 2,2'-dihydroxy-4,4'-dimethoxybenzophenone (1) 3,5-di-t-butyl-4-hydroxybenzylphosphonate diethyl ester (0.5) | Fluorescent yellow ←→ colorless 10° C., 40° C. |
| 30 | 4-benzoyloxy-2,2,6,6-tetramethylpiperidine (1) 2-(3-t-butyl-5-methyl-2-hydroxyphenyl-5-chloro-benzotriazole (3) | fluorescent orange ←→ colorless 30° C. |
| 31 | 8-acetyl-3-dodecyl-7,7,9,9-tetramethyl-1,3,8-triazaspiro-[4.5]decane-2,4-dione (0.5) 2,2'-dihydroxy-4,4'-dimethoxybenzopheneone (1) | fluorescent yellow ←→ colorless 20° C. |
| 32 | bis(2,2,6,6-tetremethyl-4-piperidyl) sebacate (0.5) 2,2'-dihydroxy-4,4'-dimethoxybenzophenone (1) | fluorescent yellow ←→ colorless 35° C. |

TABLE 4

Results of Light Resistance Test in Examples and Comparative Examples

| Example No. | Light exposure time (Fade Meter: hours) | | | | | | Comparative Example No. | Light exposure time (Fade Meter: hours) | | | | | |
|---|---|---|---|---|---|---|---|---|---|---|---|---|---|
| | 0 hr | 4 hr | 8 hr | 12 hr | 16 hr | 20 hr | | 0 hr | 4 hr | 8 hr | 12 hr | 16 hr | 20 hr |
| 12 | 100 | 98 | 96 | 94 | 91 | 79 | 1 | 100 | 95 | 88 | 75 | 60 | 42 |
| 13 | 100 | 97 | 90 | 80 | 70 | 57 | 2 | 100 | 94 | 80 | 66 | 41 | 9 |
| 14 | 100 | 98 | 97 | 96 | 92 | 86 | 3 | 100 | 95 | 82 | 66 | 38 | 7 |
| 15 | 100 | 99 | 91 | 81 | 70 | 56 | 4 | 100 | 88 | 75 | 57 | 25 | 5 |
| 16 | 100 | 98 | 97 | 94 | 89 | 81 | 5 | 100 | 94 | 89 | 75 | 61 | 41 |
| 17 | 100 | 99 | 97 | 93 | 90 | 80 | 6 | 100 | 96 | 89 | 77 | 63 | 45 |
| 18 | 100 | 98 | 90 | 81 | 71 | 55 | 7 | 100 | 94 | 80 | 65 | 40 | 8 |
| 19 | 100 | 97 | 90 | 79 | 63 | 49 | 8 | 100 | 88 | 76 | 55 | 24 | 7 |
| 20 | 100 | 98 | 90 | 80 | 70 | 58 | 9 | 100 | 94 | 81 | 66 | 42 | 9 |

TABLE 4-continued

Results of Light Resistance Test in Examples and Comparative Examples

| Example No. | Light exposure time (Fade Meter: hours) | | | | | | Comparative Example No. | Light exposure time (Fade Meter: hours) | | | | | |
|---|---|---|---|---|---|---|---|---|---|---|---|---|---|
| | 0 hr | 4 hr | 8 hr | 12 hr | 16 hr | 20 hr | | 0 hr | 4 hr | 8 hr | 12 hr | 16 hr | 20 hr |
| 21 | 100 | 98 | 96 | 94 | 89 | 80 | 10 | 100 | 95 | 87 | 74 | 61 | 41 |
| 22 | 100 | 98 | 96 | 93 | 91 | 78 | 11 | 100 | 93 | 88 | 75 | 63 | 40 |
| 23 | 100 | 99 | 97 | 93 | 89 | 80 | 12 | 100 | 94 | 87 | 70 | 48 | 21 |
| 24 | 100 | 97 | 91 | 82 | 71 | 56 | 13 | 100 | 93 | 80 | 63 | 40 | 11 |
| 25 | 100 | 98 | 97 | 94 | 90 | 79 | 14 | 100 | 93 | 89 | 73 | 65 | 45 |
| 26 | 100 | 97 | 96 | 94 | 90 | 80 | 15 | 100 | 92 | 90 | 75 | 61 | 42 |
| 27 | 100 | 98 | 92 | 82 | 71 | 58 | 16 | 100 | 94 | 81 | 63 | 40 | 11 |
| 28 | 100 | 98 | 96 | 94 | 91 | 71 | 17 | 100 | 95 | 90 | 74 | 63 | 39 |
| 29 | 100 | 97 | 92 | 80 | 70 | 59 | 18 | 100 | 93 | 80 | 63 | 40 | 12 |
| 30 | 100 | 97 | 91 | 81 | 72 | 56 | 19 | 100 | 93 | 79 | 63 | 41 | 12 |
| 31 | 100 | 98 | 91 | 82 | 72 | 55 | 20 | 100 | 93 | 80 | 62 | 40 | 11 |
| 32 | 100 | 98 | 97 | 94 | 90 | 82 | 21 | 100 | 95 | 88 | 73 | 61 | 44 |

What is claimed is:

1. A reversible thermochromic composition which develops fluorescent colors, comprising a solubilized mixture of three components of (a) an electron-donating color-developing organic compound selected from the group consisting of, quinazoline, and bisquinazoline compounds, (b) an electron-accepting compound for the electron-donating color-developing organic compound, and (c) a compound serving as a reaction medium for causing reversibly an electron exchange reaction between the components (a) and (b) within a specified temperature range.

2. A thermochromic composition which develops fluorescent colors, comprising a solubilized mixture of four components of (a) an electron-donating color-developing organic compound selected from the group consisting of pyridine, quinazoline, and bisquinazoline compounds, (b) an electron-accepting compound for the electron-donating color-developing organic compound, (c) a compound serving as a reaction medium for causing reversibly an electron exchange reaction between the components (a) and (b) within a specified temperature range, and (d) one or more light stabilizer selected from UV absorbers, antioxidants, singlet oxygen quenchers, superoxide anion quenchers, ozone quenchers, and infrared absorbers.

3. The reversible thermochromic composition according to claim 2, wherein the light stabilizer (d) is a combination of a UV absorber and one or more other stabilizers selected from the group consisting of antioxidants, singlet oxygen quenchers, superoxide anion quenchers, ozone quenchers, and infrared absorbers.

4. The reversible thermochromic composition according to claim 1, wherein the component (b), an electron accepting compound, is selected from the group consisting of compounds having a phenolic hydroxy group and metallic salts thereof, and the components (c) is a compound selected from the group consisting of alcohols, esters, ketones, and ethers.

5. The reversible thermochromic composition according to claim 2, wherein the component (b), an electron accepting compound, is selected from the group consisting of compounds having a phenolic hydroxy group and metallic salts thereof, and the component (c) is a compound selected from the group consisting of alcohols, esters, ketones, and ethers.

6. The thermochromic composition according to claim 1, wherein the composition is enclosed in microcapsules.

7. The thermochromic composition according to claim 2, wherein the composition is enclosed in microcapsules.

8. The thermochromic composition according to claim 3, wherein the composition is enclosed in microcapsules.

9. The thermochromic composition according to claim 4, wherein the composition is enclosed in microcapsules.

10. The thermochromic composition according to claim 5, wherein the composition is enclosed in microcapsules.

11. The thermochromic composition according to claim 1, wherein the reversible thermochromic composition changes color with a hysteresis width of from 8° C. to 30° C. in color density-temperature curve.

12. The thermochromic composition according to claim 2, wherein the reversible thermochromic composition changes color with a hysteresis width of from 8° C. to 30° C. in color density-temperature curve.

13. The thermochromic composition according to claim 3, wherein the reversible thermochromic composition changes color with a hysteresis width of from 8° C. to 30° C. in color density-temperature curve.

14. The thermochromic composition according to claim 4, wherein the reversible thermochromic composition changes color with a hysteresis width of from 8° C. to 30° C. in color density-temperature curve.

15. The thermochromic composition according to claim 5, wherein the reversible thermochromic composition changes color with a hysteresis width of from 8° C. to 30° C. in color density-temperature curve.

16. The thermochromic composition according to claim 6, wherein the reversible thermochromic composition changes color with a hysteresis width of from 8° C. to 30° C. in color density-temperature curve.

17. The thermochromic composition according to claim 7, wherein the reversible thermochromic composition changes color with a hysteresis width of from 8° C. to 30° C. in color density-temperature curve.

18. The thermochromic composition according to claim 8, wherein the reversible thermochromic composition changes color with a hysteresis width of from 8° C. to 30° C. in color density-temperature curve.

19. The thermochromic composition according to claim 9, wherein the reversible thermochromic composition changes color with a hysteresis width of from 8° C. to 30° C. in color density-temperature curve.

20. The thermochromic composition according to claim 10, wherein the reversible thermochromic composition changes color with a hysteresis width of from 8° C. to 30° C. in color density-temperature curve.

* * * * *

UNITED STATES PATENT AND TRADEMARK OFFICE
CERTIFICATE OF CORRECTION

PATENT NO. : 5,558,700
DATED : September 24, 1996
INVENTOR(S) : YUTAKA SHIBAHASHI ET AL.    Page 1 of 4

It is certified that error appears in the above-identified patent and that said Letters Patent is hereby corrected as shown below:

COLUMN 1

Line 33, "red-" should read --red--.

COLUMN 2

Line 5, "stabilizer" should read --stabilizers--.
Line 12, "electron accepting" should read --electron-accepting--.
Line 14, "components (c)" should read --component (c)--.
Line 18, "is" should be deleted.

COLUMN 4

Line 39, "(4-diemthylaminophenyl)" should read --(4-dimethylaminophenyl)--.
Line 41, "(4-diethylaminophenl)" should read --(4-diethylaminophenyl)--.
Line 62, "diyhenylpyridine," should read --diphenylpyridine,--.

COLUMN 5

Line 29, "6'-yl-" should read --6-yl)- --.
Line 40, "quinozo-" should read --quinazo- --.
Line 64, "qunazo-" should read --quinazo- --.
Line 67, "qunazoline]," should read --quinazoline],--.

COLUMN 6

Line 60, "derivetives" should read --derivatives--.

UNITED STATES PATENT AND TRADEMARK OFFICE
CERTIFICATE OF CORRECTION

PATENT NO. : 5,558,700
DATED : September 24, 1996
INVENTOR(S) : YUTAKA SHIBAHASHI ET AL.

It is certified that error appears in the above-identified patent and that said Letters Patent is hereby corrected as shown below:

COLUMN 7

Line 3, "dodecl" should read --dodecyl--.
Line 22, "pentadcyl" should read --pentadecyl--.
Line 27, "dialuryl" should read --dilauryl--.
Line 46, "palmirate," should read --palmitate,--.
Line 50, "steareate," should read --stearate,--.
Line 57, "palmirate," should read --palmitate,--.
Line 59, "3,7-diemtyloctyl" should read --3,7-dimethyloctyl--.

COLUMN 8

Line 17, "form" should read --from--.
Line 37, "laurete," should read --laurate,--.
Line 40, "palmirate," should read --palmitate,--.
Line 49, "2undecanone," should read --2-undecanone,--.

COLUMN 9

Line 21, "absrober" should read --absorber--.
Line 65, "hydroxypehnyl]" should read --hydroxyphenyl]--.

COLUMN 10

Line 33, "tetrametyl-" should read --tetramethyl- --.
Line 53, "-benzoyloxy-" should read --4-benzoyloxy- --.
Line 54, "tramentyl-" should read --tetramethyl- --.

COLUMN 11

Line 23, "4hydrox-" should read --4-hydrox- --.

UNITED STATES PATENT AND TRADEMARK OFFICE
CERTIFICATE OF CORRECTION

PATENT NO. : 5,558,700
DATED : September 24, 1996
INVENTOR(S) : YUTAKA SHIBAHASHI ET AL.            Page 3 of 4

It is certified that error appears in the above-identified patent and that said Letters Patent is hereby corrected as shown below:

COLUMN 12

Lines 59-60, "X is a halogen atom or a hydrogen atom;" should be deleted.

COLUMN 13

Line 56, "composer&on" should read --composition--.

COLUMN 15

Line 38, "Aplication" should read --¶ Application--.
Line 54, "10" should be deleted.

COLUMN 16

Line 41, "know" should read --known--.
Line 55, "20 Parts" should read --20 parts--.

COLUMN 19

Table 2-continued, under "Example 22",
"(ethyelnedioxy)" should read --(ethylenedioxy)--.

COLUMN 21

Table 3-continued, under "Example Component (d) 29",
"Fluorescent" should read --fluorescent--,
under "Example 31",
"dimethoxybenzopheneone" should read
--dimethoxybenzophenone-- and
under "Example 32",
"tetremethyl-" should read --tetramethyl- --.

UNITED STATES PATENT AND TRADEMARK OFFICE
CERTIFICATE OF CORRECTION

PATENT NO. : 5,558,700
DATED : September 24, 1996
INVENTOR(S) : YUTAKA SHIBAHASHI ET AL.

It is certified that error appears in the above-identified patent and that said Letters Patent is hereby corrected as shown below:

COLUMN 23

Line 25, "of, quinazoline," should read --of pyridine quinazoline--.
Line 41, "stabilizer" should read --stabilizers-- and "from" should read --from the group consisting of--.
Line 51, "electron accepting" should read --electron-accepting--.
Line 54, "components (c)" should read --component (c)--.
Line 57, "electron accepting" should read --electron-accepting--.

Signed and Sealed this

Third Day of June, 1997

BRUCE LEHMAN

Attest:

Attesting Officer

Commissioner of Patents and Trademarks